United States Patent
Moosberg

[11] 4,042,186
[45] Aug. 16, 1977

[54] FISHING REEL WITH BEARING FOR LEVEL WIND SHAFT

[75] Inventor: Börje Sigurd Moosberg, Morrum, Sweden

[73] Assignee: ABU Aktiebolag, Svangsta, Sweden

[21] Appl. No.: 623,990

[22] Filed: Oct. 20, 1975

[30] Foreign Application Priority Data

Oct. 21, 1974 Sweden .............................. 7413211

[51] Int. Cl.² ...................... A01K 89/04; F16C 27/00; F16C 43/00
[52] U.S. Cl. ................................. 242/84.42; 308/238
[58] Field of Search ................ 242/84.42, 84.41, 84.4, 242/86.61, 158.3, 158.2; 308/238, DIG. 7, 22

[56] References Cited

U.S. PATENT DOCUMENTS

| | | | |
|---|---|---|---|
| 1,496,492 | 6/1924 | Russell | 242/84.42 |
| 3,186,287 | 6/1965 | Wehlau | 308/238 |
| 3,366,356 | 1/1968 | Fisher | 308/238 |
| 3,874,752 | 4/1975 | Imazaike | 308/238 |

Primary Examiner—Billy S. Taylor
Attorney, Agent, or Firm—Karl W. Flocks

[57] ABSTRACT

This invention relates to an apparatus in fishing reels with a line guiding mechanism including a double-threaded screw and a bearing box. According to a preferred embodiment, the bearing box displays at least two diametrically located resilient projections extending from its outer surface, and the portion of the reel frame for fixing of the bearing box has an opening through which the bearing box is insertable to its operative position for journaling one end of the double-threaded screw, and two slots diametrically placed on either side of the opening for locking cooperation with the projections, the apparatus being such that the resilient projections of the bearing box, on insertion of the bearing box in the axial direction of the double-threaded screw through the opening towards the correct operative position relative to the frame portion, are moved in through the slots which are so disposed that the projections, on the above-mentioned movement and engagement, are first, through engagement with the defining edges of the slots, resiliently bent or compressed and then, in conjunction with the arrival of the bearing box at the operative position, spring back into locking engagement with the frame portion.

7 Claims, 4 Drawing Figures

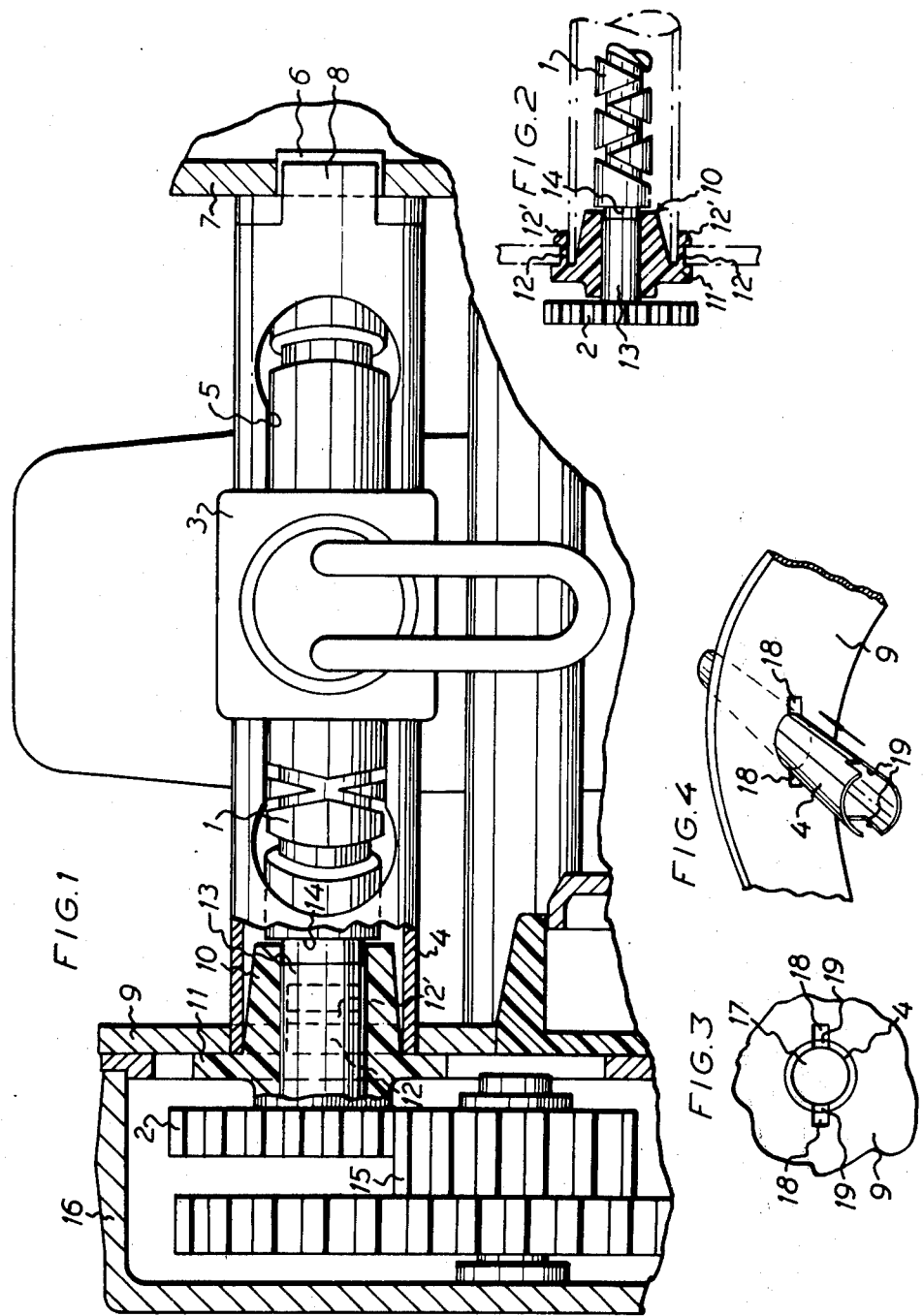

FISHING REEL WITH BEARING FOR LEVEL WIND SHAFT

The present invention relates generally to fishing reels and particularly to an apparatus in fishing reels with a line-guiding mechanism for the journaling of at least the one end of the double-threaded screw of the line-guiding mechanism in a sleeve-like bearing box and for fixing the bearing box at a portion of the frame of the reel.

It is a known fact that the line-guiding mechanism of a fishing reel comprises a rotatably journaled double-threaded screw driven by the crank of the reel and a pawl or half-nut driven reciprocally in a linear path by the double-threaded screw and reciprocally moving a line guide in the axial direction of the spool for distribution of the line on the spool during the winding-in of the reel. In a prior art construction, the double-threaded screw is surrounded by a tubular line guide which forms a protective hood for the double-threaded screw and has a slot facing the half-nut thus providing a free path of movement for the half-nut. Moreover, in the prior art construction the double-threaded screw is journaled at its ends in bearing boxes which are fixed in relation to the reel frame. The bearing boxes can, for example, be inserted in the ends of the guide tube and can extend into holes axially in register with each other in the frame ends on either side of the spool and the guide tube can be mounted between the frame ends with the tubular ends located coaxially in relation to the above-mentioned end holes, the tube and the bearing boxes inserted in the ends of the tube providing mutual support. The bearing boxes for the double-threaded screw can consist of cap-like or open-ended sleeves of plastic and in one prior art design, one of the bearing sleeves is axially fixed on the one pin of the double-threaded screw to serve both as an axial and radial bearing. The axial fixing of the double-threaded screw and the connection of the guide tube to the frame can be arranged in many different ways but it is very important that the components can easily be assembled and dismantled. In a prior art embodiment, the guide tube can be inserted in the opening in one end of the frame and then be inserted with its other end in positive engagement locked against rotation in a seat in the other end opening, the double-threaded screw being then fixed axially at either end by means of a locking washer or the like which is fixed on the outer side of the corresponding frame end and engages, for example, between abutment surfaces on the screw or the bearing, the guide tube being simultaneously fixed against an abutment surface on the bearing.

Granted, the above-described apparatus is satisfactory in that it provides, for example, reliable retention of the components and a stable journaling of the double-threaded screw, at the same time as the parts are relatively easy to assemble and dismantle without the need of tools. However, this embodiment does not preclude the necessity of improvements and simplifications and the precise aspect to the present invention is to provide an improved and simplified embodiment of the apparatus for journaling and axial fixing of the double-threaded screw and for locking of the guide tube. A further aspect of the present invention is to realise a construction of this apparatus such that it does not load the double-threaded screw with other friction than pure bearing friction and permits operating the line guide mechanism in an at least as simple manner as in the corresponding prior art constructions.

According to the invention, the bearing box displays at least two diametrically located resilient projections extending from its outer surface and the portion of the frame for fixing of the bearing box has an opening through which the bearing box is insertable to its operative position for journaling one end of the double-threaded screw, and two slots diametrically placed on either side of the opening, for locking cooperation with the projections, the apparatus being such that the resilient projections of the bearing box, on insertion of the bearing box in the axial direction of the double-threaded screw through the opening towards the correct operative position relative to the frame portion, are moved in through the slots which are so disposed that the projections, on the above-mentioned movement and engagement, are first, through engagement with the defining edges of the slots, resiliently bent or compressed and then, in conjunction with the arrival of the bearing box at the operative position, spring back into locking engagement with the frame portion.

The nature of the invention and its objects will be more fully understood from the following description of the drawing, and discussion relating thereto.

In the accompanying drawing:

FIG. 1 shows a section, parallel to the shaft of the spool, of a portion of a fishing reel with a line-guide mechanism and an apparatus according to the invention for journaling and axial fixing of the double-threaded screw and the guide tube for the line guide by fixing of a bearing in the reel frame;

FIG. 2 is a side elevation of a portion of the double-threaded screw and shows, in axial section and in greater detail than in FIG. 1, a bearing box according to the invention, the guide tube and a casing end wall being intimated by means of dot-dash lines;

FIG. 3 is a perspective view of a portion of the guide tube and a portion of the frame end in an assembly phase for illustration of how the slots in the end of the guide tube and in the frame end will cooperate after assembly; and FIG. 4 is a view of a portion of the frame end of FIG. 3 and the end of the guide tube in position in its intended opening in the frame end and shows the slots, cooperating in pairs, for the accommodation of locking jaws.

The line-guide mechanism consists of a double-threaded screw 1 which is arranged to be operated by means of the crank of the fishing reel by the intermediary of a gear means which includes a gear wheel 2 supported on one end of the double-threaded screw and a pawl or half nut (not shown) engaging with the double-threaded screw and connected to a line guide 3 for movement of the line guide reciprocally in the axial direction of the screw 1 when the screw is operated. The line guide 3 is run on a guide in the form of a tube 4 which surrounds the screw 1 as a protective casing and has an open slot 5 to allow the passage of the connection between the half nut and the line guide 3.

The right-hand end of the double-threaded screw, as seen in FIG. 1, can, in the illustrated conventional manner, be journaled in a bearing 6 which is inserted in the end of the guide tube 4 and extends into or through an opening provided as a seat in the right-hand reel frame end 7 in FIG. 1. The corresponding end of the guide tube 4 is similarly fixed, in a known manner, in the frame end 7 in that a fork-like end portion of the guide tube extends with its prongs 8 into the diametrical enlargements in the opening in the frame end 7 for the outer end portion of the bearing 6. The bearing 6, which can be in the form of a sleeve which is open at both ends or at least at the inner end, is fixed against rotation in that the tube prongs 8 engage on shoulders or planar surfaces in the circumference of the bearing sleeve 6.

The bearing arrangement on the left-hand end of the double-threaded screw 1 as seen in FIG. 1, is realised in accordance with the present invention and forms a complement to the right-hand bearing arrangement for journaling and axial fixing of the double-threaded screw and, as will be apparent from the following description, the bearing arrangement according to the invention is also used for fixing the guide tube 4 on the frame without the help of separate fixing or locking means.

In the illustrated embodiment, the bearing arrangement according to the present invention includes in the left-hand frame end 9 in FIG. 1, a bearing box in the form of an open-ended sleeve 10 which, like the right-hand bearing sleeve 6, can be of plastic. The bearing sleeve 10 has, at its outer circumference, a disc-shaped flange 11 and two diametrically located resilient projections 12 directed axially inwardly from the flange 11 for releasable locking of the bearing sleeve 10 relative to the frame. The flange 11 and the projections 12 are integrally made with the bearing sleeve 10; and the projections 12 are, in the illustrated preferred embodiment, in the form of resilient locking jaws which extend from the flange 11 in an axial inward direction towards the line guide parallel to the axis of the bearing sleeve 10 and are spaced a short distance from the outer circumference of the bearing sleeve.

As shown in the drawings, the bearing sleeve 10 is mounted on an end portion of frame double-threaded screw 1 formed as a pin 13 between an abutment surface 14 and the gear wheel 2 mounted at the end of the pin 13 and forms an axial support bearing as well as a radial bearing for the double-threaded screw 1. Mounted in place, the bearing sleeve flange 11 rests on a planar surface on the outer side of the frame end 9. The flange 11 is provided on the bearing sleeve 10 a distance inside its one outer end for maintaining the gear wheel 2 in the correct position for engagement with the drive gear wheel 15 when the end casing 16 is mounted on the frame end 9. The portion of the bearing sleeve 10 located axially inside the flange 11 is inserted in the adjacent end of the guide tube 4, this end resting in a suitable circular opening 17 in the frame end 9 and abutting against the flange 11 and against the adjacent portion of the outer circumferential surface of the bearing sleeve 10. This surface may be conical as is shown in the drawing.

In association with the opening 17 two rectangular recesses or slots 18 are made in the frame end 9, these slots forming two diametrically located enlargements of the opening 17 (please see FIGS. 3 and 4) and constituting the seats for accommodation of the locking jaws 12 of the bearing sleeve. The corresponding end portion of the guide tube 4 has two diametrically located slots 19 which are rectangular like the recesses or seats 18 and are of the same width as them.

In the assembly of the line guide mechanism, the guide tube 4 is inserted (with the right-hand bearing sleeve 6 mounted in place on the right-hand end of the tube) in the opening 17 in the frame end 9 in the manner illustrated in FIG. 3 (the tube 4 at the same time being inserted in the line guide 3). The tube 4 is twisted to such a position that its end prongs 8 are directed towards their intended seats in the end 17, whereupon the tube is moved to the right, this being intimated by means of an arrow in FIG. 4, so that the prongs 8 (not shown in FIG. 3) are inserted in the seats in the right-hand end 7 (please see FIG. 1). When this position has been reached, the left-hand end of the tube rests in the opening 17 in the left-hand end 9 and the right-hand end of the tube abuts against the inner side of the right-hand end 7. The tube slots 19 are then located facing and in connection with the slots 18 in association with the circular opening 17 so that the slots form L-shaped openings in pairs (please see FIG. 4) which are prepared to accommodate the locking jaws 12 on the bearing sleeve 10. The double-threaded screw 1 is then inserted in the left-hand end of the guide tube, is screwed simultaneously into engagement with the half nut of the line guide and is inserted with the right-hand pin into the bearing sleeve 6 (FIG. 1), the locking jaws 12 of the left-hand bearing sleeve 10 at the same time being inserted in the slots 18. The locking jaws 12 are arranged such that, on insertion, they are first bent inwardly by the edges which radially define the slots 18 and are pressed into the end slots 19 in the tube 4, they then springing radially outwardly when radial projections 12' at the ends of the jaws 12 have reached the inner side of the frame end 9. Consequently, the bearing sleeve 10 is fixedly "snapped" to the frame end 9 in a locking position in which the sleeve flange 11 abuts against the outer side of the frame end 9, the bearing sleeve 10 then holding both the double-threaded screw 1 and the guide tube 4 in place. In the described engagement position, the locking jaws 12 can extend down into the end slots 19 of the guide tube 4 to aid in the locking of the guide tube against rotational movement, this being dealt with by the fork prongs 8 at the other end of the guide tube.

The locking jaws 12 are located a suitable radial distance from the outer circumferential surface of the sleeve-shaped bearing box 10 to permit insertion of the guide tube 4 in the bearing box beneath the jaws 12. In actual fact, such a spacing between the jaws and the bearing box is not absolutely necessary but can facilitate assembly since the jaws can be utilized as means for holding together the double-threaded screw 1, the guide tube 4 and the bearings, which can be assembled as a unit. After mounting of the right-hand end of the unit in place, the bearing box 10 can, if necessary, be twisted so that the jaws 12 lie in the correct position relative to the slots, the bearing box (and the screw 1) being then finally inserted in place.

The complete assembly process described above can be carried out manually without the help of tools. Dismantling can also be carried out manually, the first step being to bend with the fingers of one hand the locking jaws 12 into the tube slots 19 and with the other hand to pull out the double-threaded screw together with the gear wheel 2 and the bearing box 10.

It should be noted that the axial fixing of the double-threaded screw does not entail that the double-threaded screw is loaded with any extra friction or exposed to any abrasion. The only friction to which the double-threaded screw is exposed is the slight bearing friction.

In the above description, it has been assumed that the bearing box 10 is in the form of a sleeve provided with a disc-shaped flange 11 and two locking jaws 12 supported by the flange and this embodiment would seem to be the most practical. However, it should also be possible to achieve an effective locking either with a single locking jaw or with more than two locking jaws or equivalent projections 12. It should be possible to use, instead of the flange 11, for example an abutment surface on the bearing box 10, in which case it should be possible for the locking jaws or equivalent resilient projections to be supported on the circumferential surface of the bearing box. The resilience can be adapted by the selection of material for the bearing box 10, but in view of the fact that the choice of material is determined primarily by the bearing properties of the material, the resilience can probably best be adapted by suitable dimensioning.

For the purpose of locking, the axial length of the locking jaws or projections 12 need not be larger than that required for engagement with the frame end 9, but to facilitate dismantling, they should project sufficiently far inwardly from the inner side of the frame end 9 such that they can be clamped or bent inwardly without difficulty by the fingers or by means of a simple tool.

It should be noted that the invention is in principle also applicable to the bearing apparatus for the left-hand end of the double-threaded screw 1 in FIG. 1, that is to say the end of the double-threaded screw opposite in relation to the gear wheel 2, but the illustrated and described embodiment would seem to be the simplest and most practical in all respects, for which reason it is to be preferred.

What I claim and desire to secure by Letters Patent is:

1. In a fishing reel having a frame including a wall member, a line-guide mechanism comprising a rotatable reversely threaded traversing screw, a line guide slidable on and operatively associated with said screw, and a bearing member for said screw mounted in said wall member, said wall member having an opening and said bearing member having a front end portion axially insertable in said opening, a rear end portion extending backwardly from said opening when the bearing member mounted on the screw is inserted in said opening, said wall member having two angularly spaced slots and said bearing member having two angularly spaced resilient projections extending axially from the rear end portion thereof in positions to be received each by one of said slots when the bearing member is inserted in said opening to a seated operative position therein for journalling the screw, said resilient projections being dimensioned and formed to be elastically radially deformed by axial force exerted upon said bearing member under insertion thereof into said opening and then, in conjunction with the arrival of said bearing member at its operative position, to spring back into locking engagements with said wall member to lock said bearing member in said position.

2. The mechanism as claimed in claim 1 and further comprising a housing supported between said wall member and an opposite wall member for guiding the line guide and protecting said screw, said housing having coaxial tubular ends formed for releasable connection to said wall member in a position in which said tubular ends are coaxial with said opening, said bearing member being supported in an axially fixed position on an end portion of said screw and being formed to serve both as an axial and radial bearing for said screw, said front end portion of said bearing member being formed to be insertible through said opening into the adjacent one of the tubular housing ends to form a support therefor and having on its rear end portion a flange forming an abutment against the outer side of said wall member and a support for the adjacent end of said guide element, said projections on said bearing member having the form of resilient locking jaws supported by said flange and extending substantially axially inwardly therefrom, said locking jaws being provided with grooves for said locking engagement with edges which radially define said slots.

3. The mechanism of claim 2, wherein said slots in said wall member extend substantially radially from said opening in said wall member.

4. The mechanism of claim 2, wherein said axially extending jaws are radially spaced from the outer circumferential surface of the front end portion of said bearing member and are formed for elasticaly grasping the adjacent tubular end of said housing between said jaws and said front end portion of said bearing member when the jaws are inserted in said slots.

5. The mechanism of claim 2, wherein said adjacent tubular end portion of said housing is provided with two diametrically located axial slots which are formed to effect bending of the resilient locking jaws radially inwardly when said front end portion of the bearing member is inserted into said tubular end portion thereby facilitating insertion of said jaws in said radial slots in said wall member.

6. The mechanism of claim 12, wherein said jaws are disposed, in the locking position, to partially engage in the axial slots in the adjacent tubular end portion of said housing to lock said housing against rotational movement as a complement to the axial fixing of said housing by said bearing member flange.

7. The mechanism of claim 2, wherein said locking jaws of said bearing member are of such a length that their inner ends, after mounting in said operating position, are accessible from the inner side of said wall member for bending of said jaws and thereby facilitating dismounting.

* * * * *